United States Patent
Cheng et al.

(10) Patent No.: US 9,880,192 B2
(45) Date of Patent: Jan. 30, 2018

(54) METHOD OF MANUFACTURING A MOTION SENSOR DEVICE

(71) Applicant: Taiwan Semiconductor Manufacturing Company, Ltd., Hsin-Chu (TW)

(72) Inventors: Shyh-Wei Cheng, Zhudong Township (TW); Yu-Ting Hsu, Zhubei (TW); Hsi-Cheng Hsu, Taichung (TW); Chih-Yu Wang, Taichung (TW); Jui-Chun Weng, Taipei (TW); Che-Jung Chu, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 180 days.

(21) Appl. No.: 14/609,234

(22) Filed: Jan. 29, 2015

(65) Prior Publication Data

US 2015/0177273 A1 Jun. 25, 2015

Related U.S. Application Data

(63) Continuation of application No. 13/353,059, filed on Jan. 18, 2012, now Pat. No. 8,960,003.

(60) Provisional application No. 61/535,687, filed on Sep. 16, 2011.

(51) Int. Cl.
*H01R 31/00* (2006.01)
*G01P 15/125* (2006.01)
*H01G 5/16* (2006.01)
*G01P 15/08* (2006.01)

(52) U.S. Cl.
CPC ............ *G01P 15/125* (2013.01); *H01G 5/16* (2013.01); *G01P 2015/0871* (2013.01); *Y10T 29/43* (2015.01)

(58) Field of Classification Search
CPC .......... G01P 15/08; G01P 15/125; H01G 5/16
See application file for complete search history.

(56) References Cited

U.S. PATENT DOCUMENTS

| | | | |
|---|---|---|---|
| 6,992,810 B2 * | 1/2006 | Pan | G02B 26/0841 359/290 |
| 7,100,444 B2 * | 9/2006 | Challoner | G01C 19/5719 73/504.02 |
| 7,121,141 B2 | 10/2006 | McNeil | |
| 7,146,856 B2 * | 12/2006 | Malametz | G01P 15/0802 73/514.23 |
| 7,487,661 B2 | 2/2009 | Ueda | |
| 7,578,190 B2 | 8/2009 | Lin | |
| 8,079,262 B2 | 1/2011 | Guo | |
| 8,100,012 B2 | 1/2012 | Martin | |
| 8,146,425 B2 | 4/2012 | Zhang | |
| 8,555,720 B2 | 10/2013 | Schultz | |
| 8,596,123 B2 | 12/2013 | Schultz | |

(Continued)

*Primary Examiner* — Paul D Kim
(74) *Attorney, Agent, or Firm* — Slater Matsil, LLP

(57) ABSTRACT

A Micro-Electro-Mechanical System (MEMS) device includes a sensing element, and a proof mass over and overlapping at least a portion of the sensing element. The proof mass is configured to be movable toward the sensing element. A protection region is formed between the sensing element and the proof mass. The protection region overlaps a first portion of the sensing element, and does not overlap a second portion of the sensing element, wherein the first and the second portions overlap the proof mass.

20 Claims, 3 Drawing Sheets

(56) References Cited

U.S. PATENT DOCUMENTS

| | | | |
|---|---|---|---|
| 8,960,003 B2* | 2/2015 | Cheng | G01P 15/125 |
| | | | 73/514.32 |
| 9,551,728 B2* | 1/2017 | Krylov | G01P 15/097 |
| 2003/0150267 A1* | 8/2003 | Challoner | G01C 19/5656 |
| | | | 73/504.02 |
| 2004/0025591 A1 | 2/2004 | Yoshikawa | |
| 2009/0308149 A1 | 12/2009 | Kishida | |
| 2010/0193884 A1* | 8/2010 | Park | B81C 1/00269 |
| | | | 257/414 |

* cited by examiner

METHOD OF MANUFACTURING A MOTION SENSOR DEVICE

PRIORITY CLAIM AND CROSS-REFERENCE

This application is a continuation of U.S. patent application Ser. No. 13/353,059 entitled "Motion Sensor Device and Methods for Forming the Same," filed Jan. 18, 2012 now U.S. Pat. No. 8,960,003, which application claims the benefit of provisionally filed U.S. Provisional Application No. 61/535,687, filed Sep. 16, 2011, and entitled "Motion Sensor Device and Methods for Forming the Same," which applications are hereby incorporated herein by reference.

BACKGROUND

Micro-Electro-Mechanical System (MEMS) devices may be used in various applications such as micro-phones, accelerometers, inkjet printers, etc. A commonly used type of MEMS devices includes a MEMS capacitor that has a movable element (sometimes referred to as a proof mass) as a capacitor plate, and a fixed element as the other capacitor plate. The movement of the movable element causes the change in the capacitance of the capacitor. The change in the capacitance may be converted into the change in an electrical signal, and hence the MEMS device may be used as a micro-phone, an accelerometer, or the like.

The distance between the movable element and the fixed element is typically small. During the manufacturing and the using of the MEMS devices, the movable element may stick to the fixed element, which is known as stiction in the art. When the stiction occurs, the respective MEMS device fails.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Motion sensors in the form of Micro-Electro-Mechanical System (MEMS) devices and the methods of forming the same are provided in accordance with various embodiments. The variations of the embodiments are discussed. Throughout the various views and illustrative embodiments, like reference numbers are used to designate like elements. It is noted that although a rotational motion sensor is used to explain the concept of the embodiments, the teaching may be used on various other types of MEMS devices, as along as proof masses are used.

Figure 1:
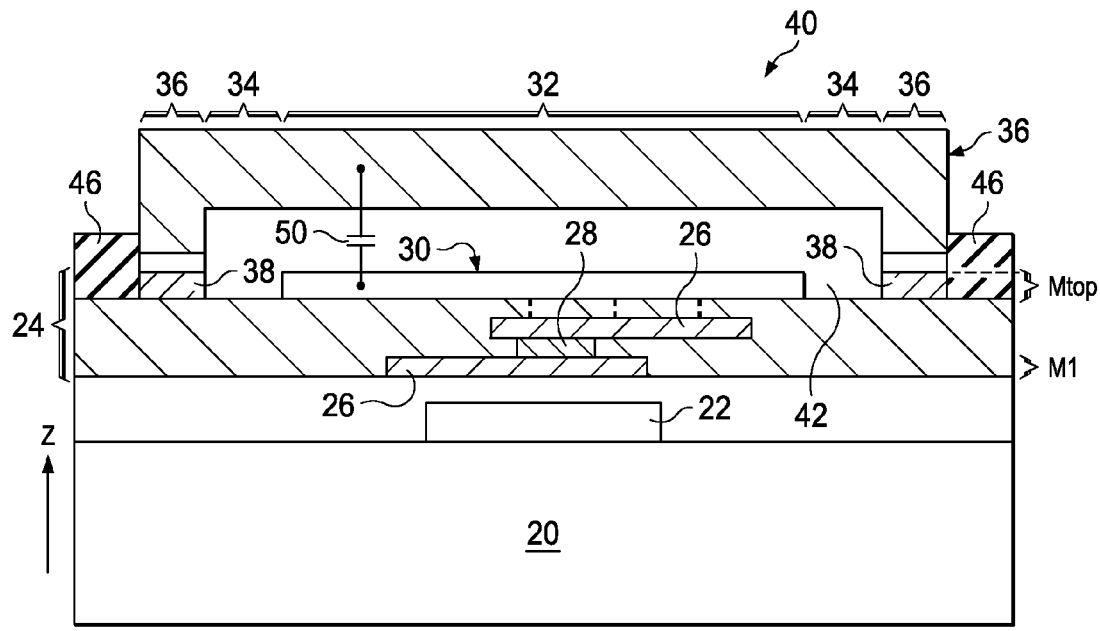
FIGS. 1 through 4 are cross-sectional views and a top view of a motion sensor in accordance with various embodiments, wherein protection regions are formed between a sensing element and a respective overlying proof mass.

FIG. 1 illustrates a cross-sectional view of MEMS device 40 in accordance with some embodiment. In some embodiments, substrate 20 that is underlying MEMS device 40 may be a semiconductor substrate such as a silicon substrate, although other semiconductor materials such as silicon germanium, silicon carbon, III-V compound materials, and the like may be used. Active devices 22 such as Complementary Metal-Oxide-Semiconductor (CMOS) devices (transistors) may be formed on a surface of semiconductor substrate 20. Metal layers 24, which include metal lines 26 and vias 28 formed in dielectric layers, are formed over substrate 20 and active devices 22. Active devices 22 are electrically coupled to metal lines 26 and vias 28 in metal layers 24. Metal layers 24 include bottom metal layer Ml through top metal layer Mtop, wherein the symbol "top" represents the total number of metal layers, which may be 3, 4, 5, or greater. In some embodiments, metal layers M1 through M(top−1) (not shown, the metal layer immediately under metal layer Mtop) may be formed of copper using damascene processes. Top metal layer Mtop may be formed of an aluminum-containing material such as aluminum copper (AlCu). The formation of top metal layer Mtop may include depositing a blanket metal layer, and patterning the metal layer. Passivation layer 46 may be formed to cover some portions of the structures in FIG. 1, and may be formed in the regions that top metal layer Mtop are removed. In some embodiments, passivation layer 46 is formed of silicon oxide, silicon nitride, or the like, although other dielectric materials such as polymers (for example, polyimide), may be used.

After the patterning of top metal layer Mtop, a remaining portion of top metal layer Mtop forms sensing element 30, which is also referred to as a fixed element since during the usage of the respective MEMS device 40, the position of sensing element 30 is fixed. Proof mass 32 is disposed over sensing element 30. Proof mass 32, which is electrically conductive, may be connected to rotation axes 34 that are connected to opposite sides of proof mass 32. Proof mass 32 and sensing element 30 form capacitor plates of capacitor 50, which is a part of MEMS device 40. Air-gap 42 is formed between proof mass 32 and sensing element 30 to act as the capacitor insulator. Proof mass 32 may move toward and away from sensing element 30 due to the existence of air-gap 42.

Proof mass 32 may be anchored and supported through anchors 36, which may also be used as the electrical connection to electrically couple to proof mass 32. Anchors 36 may be bonded to some remaining portions 38 of top metal layer Mtop, wherein the bonding may be achieved through eutectic bonding, for example. Anchors 36, rotation axes 34, and proof mass 32 may be formed of a same conductive material, which may be a silicon-containing material such as crystalline silicon, polysilicon, amorphous silicon, or the like. In alternative embodiments, proof mass 32 is formed of a material different from the materials of anchors 36, and may be formed of a conductive material other than silicon. Air-gap 42 allows proof mass 32 to rotate around rotation axes 34, so that the capacitance of capacitor 50 may be changed. The capacitance of capacitor 50 reflects the Z-direction movement of proof mass 32. In an exemplary embodiment, MEMS device 40 may be used as a motion sensor such as an accelerometer. In response to different acceleration rates, the capacitance values of capacitor 50 may be different.

Figure 2:
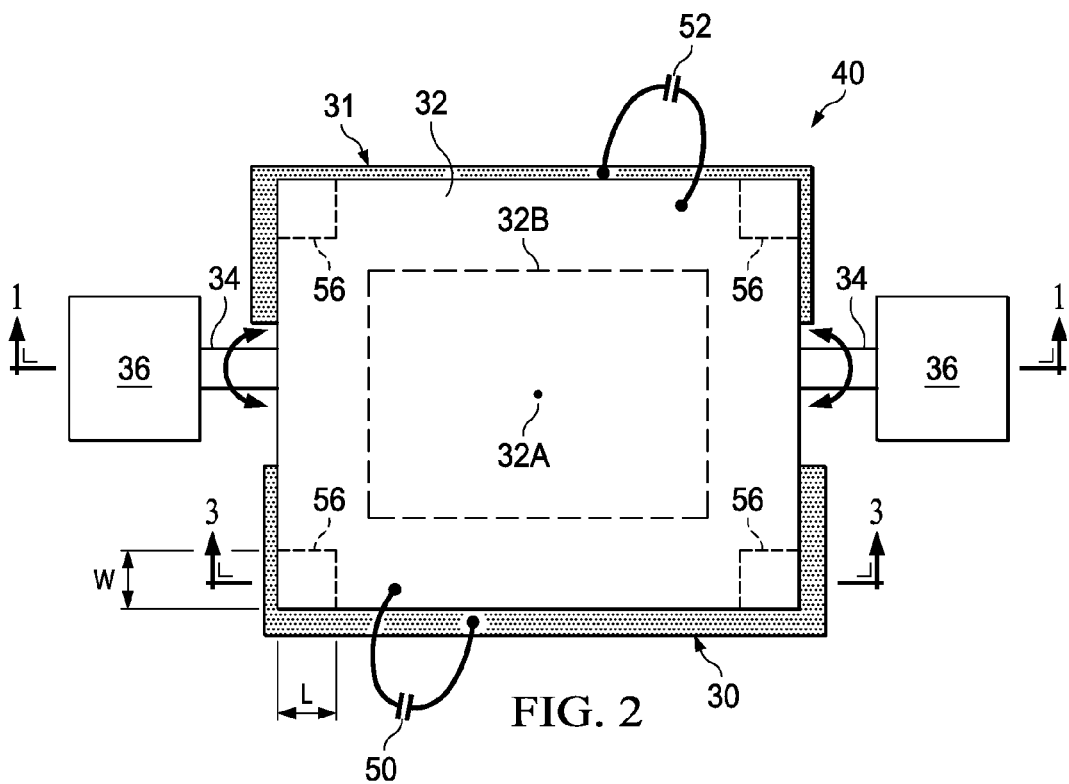

FIG. 2 illustrates a top view of MEMS device 40 as shown in FIG. 1, wherein the cross-sectional view shown in FIG. 1 is obtained from the plane crossing line 1-1 in FIG. 2.

MEMS device 40 may optionally include an additional sensing element 31, which is disposed on an opposite side of axes 34 than sensing element 30. Sensing element 31 and proof mass 32 forms capacitor 52, which is also a part of MEMS device 40. Proof mass 32 may have center 32A that is not aligned to rotation axes 34. Accordingly, in response to the acceleration in the Z-direction (shown in FIG. 1), proof mass 32 rotates around axes 34, and the distance between proof mass 32 and sensing element 30 decreases, resulting in an increase in the capacitance of capacitor 50. In the meantime, the capacitance of capacitor 52 decreases. Conversely, in response to the deceleration in the Z-direction (shown in FIG. 1), proof mass 32 rotates around axes 34, and the distance between proof mass 32 and sensing element 30 increases, resulting in an decrease in the capacitance of capacitor 50. In the meantime, the capacitance of capacitor 52 increases.

When proof mass 32 moves toward sensing elements 30 or 31, portions of proof mass 32 may hit corresponding portions of sensing elements 30 or 31. Sensing elements 30 and 31 may be formed of relatively soft materials such as aluminum copper. As a result, the touching of proof mass 32 to sensing elements 30 and/or 31 may cause stiction, and hence MEMS device 40 fails. Protection regions 56 are thus formed between proof mass 32 and sensing elements 30 and 31 to prevent the stiction. In FIG. 2, protection regions 56 are illustrated using dashed lines to indicate that protection regions 56 are covered by proof mass 32.

Figure 3:
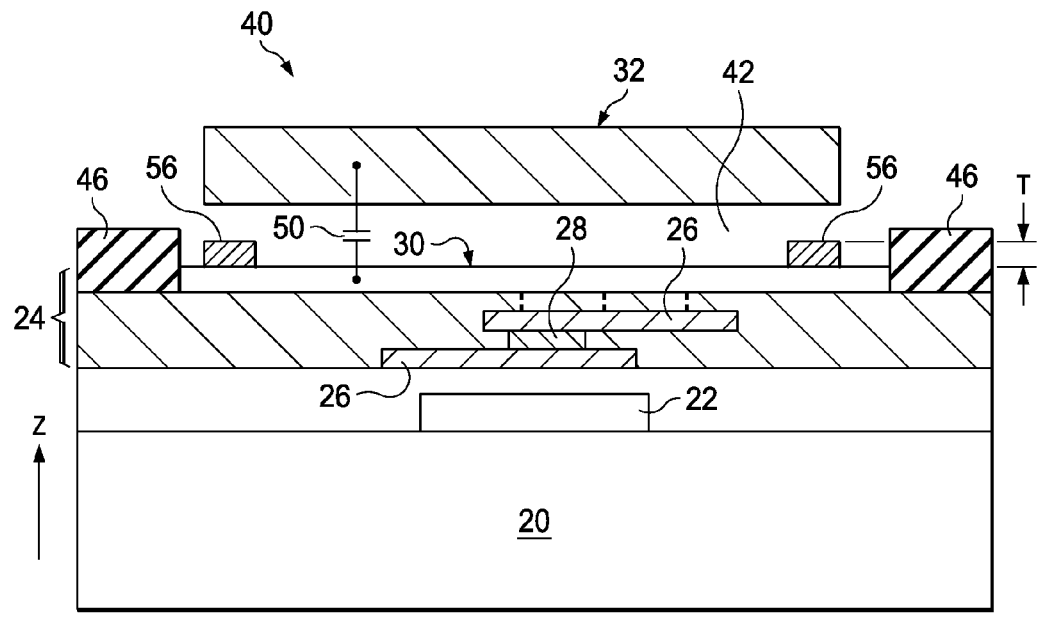

FIG. 3 illustrates a cross-sectional view of MEMS device 40, wherein the cross-sectional view is obtained from the plane crossing line 3-3 in FIG. 2. In an embodiment, protection regions 56 are formed on the top surface of, and may contact, sensing element 30. The hardness of the forming material of protection regions 56 may be greater than the hardness of sensing element 30, so that protection regions 56 are not damaged by the cleaning and etching steps that are performed after the formation of protection regions 56. Furthermore, the material of protection regions 56 does not react with the material of proof mass 32, so that when proof mass 32 is in contact with protection regions 56, no reaction and no stiction occurs between proof mass 32 and protection regions 56. In some embodiments, protection regions 56 are formed of titanium nitride, tantalum nitride, or other metal nitrides. In alternative embodiments, protection regions 56 are formed of specific dielectrics such as silicon oxide and/or silicon nitride. In yet other embodiments, protection regions 56 are formed of titanium tungsten.

Thickness T of protection regions 56 may be between about 1 kÅ and about 2 kÅ, although thickness T may be greater or smaller. The formation methods of protection regions 56 may include a deposition step for depositing a blanket layer, and a lithography and etching step performed on the blanket layer.

Protection regions 56 may be formed over (and may be in contact with) selected portions of sensing element 30 (and 31, which is shown in FIG. 2). The selected regions are the regions that are likely to be hit by proof mass 32. The regions of sensing elements 30 and 31 that are unlikely to be hit by proof mass 32 may not have protection regions 56 formed thereon, although protection regions 56 may also extend to these regions in alternative embodiments. For example, referring to FIG. 2, in the top view, protection regions 56 may be formed to overlap four corner regions of proof mass 32. Central region 32B of proof mass 32, however, may not be covered by protection regions 56. Accordingly, if proof mass 32 moves toward sensing elements 30 or 31, proof mass 32 will be in touch with and stopped by protection regions 56, which act as the contact interface of proof mass 32. As a result, proof mass 32 is not able to touch sensing elements 30 and 31. In the top view as in FIG. 2, the lateral sizes L and W (which are measured in the plane perpendicular to the Z-direction) of protection regions 56 may be small, so that the adverse effect to the performance of MEMS device 40 caused by protection regions 56 may be minimized. For example, lateral sizes L and W may be smaller than about 1 μm, although lateral sizes L and W may be greater. In addition, although in the illustrated embodiments, protection regions 56 covers portions, but not all of the top surfaces of sensing elements 30 and 31, protection regions 56 may form a continuous region covering an entirety of one or both of sensing elements 30 and 31.

Figure 4:
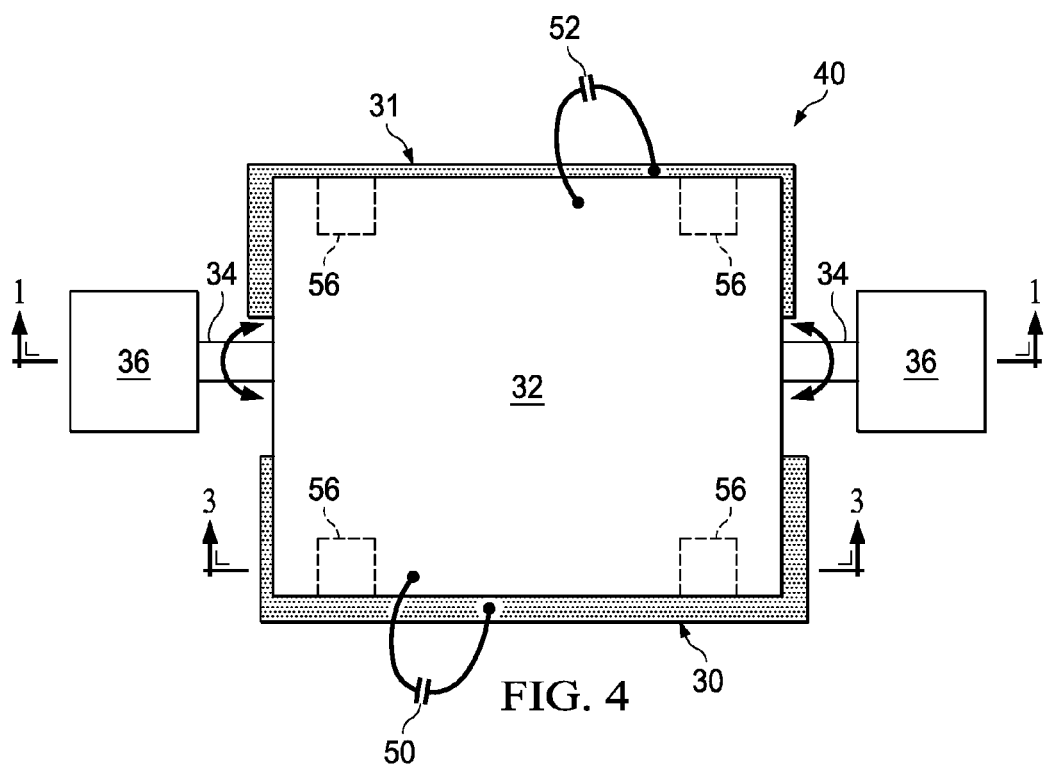

It is appreciated that the illustrated locations and shapes of protection regions 56 are merely examples, and different locations and shapes may be adopted as long as protection regions 56 can prevent proof mass 32 from contacting sensing element 30. For example, FIG. 4 illustrates some exemplary locations and shapes that can be used for forming protection regions 56. The usable locations include regions overlapping edges of proof mass 32. The shapes of protection regions 56 may be rectangles (such as squares), circles, hexagons, octagons, or the like.

Figure 5:
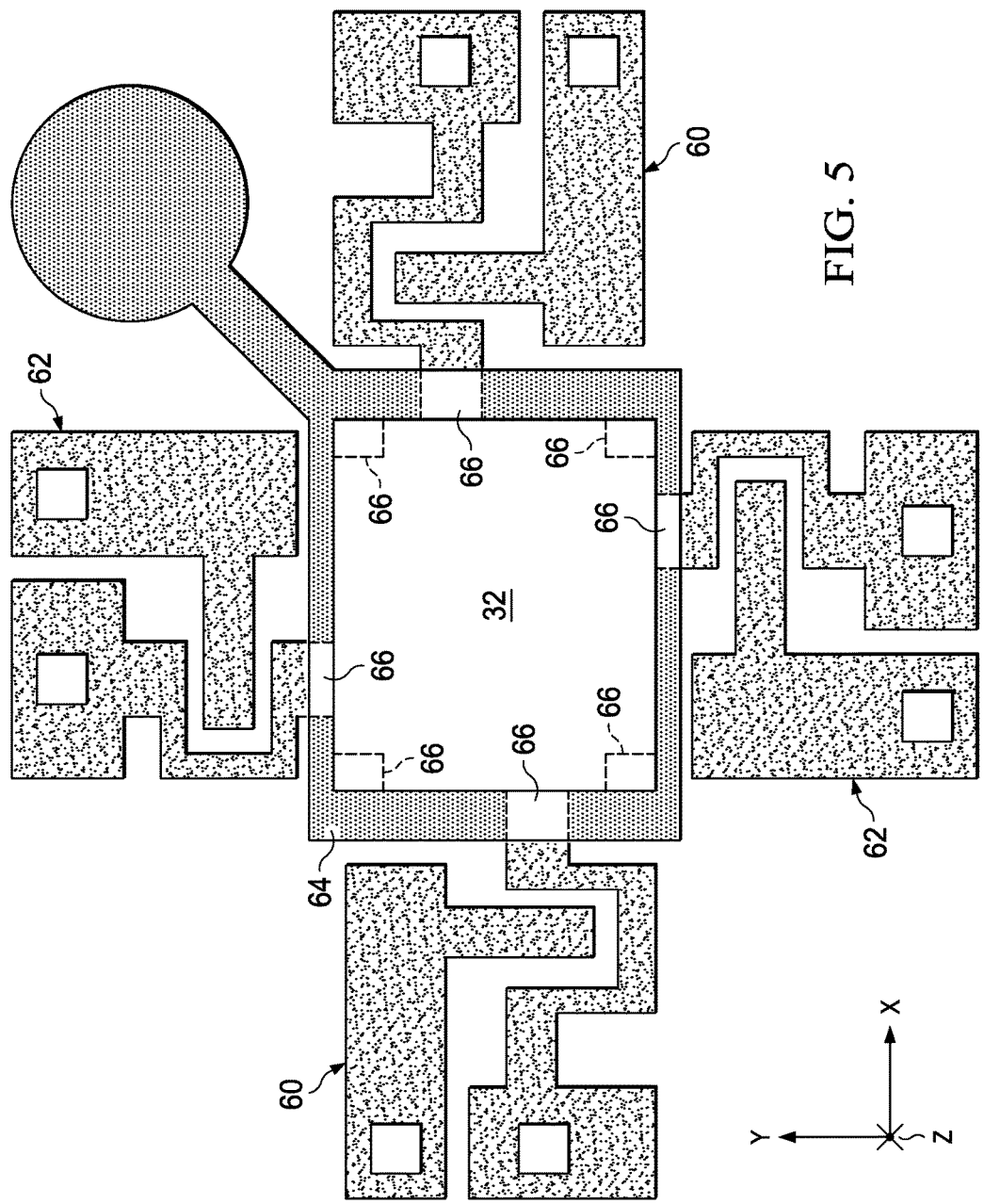
FIG. 5 illustrates a motion sensor in accordance with alternative embodiments, wherein protection regions are formed.

In the embodiments in FIGS. 1 through 4, proof mass 32 has a rectangular top-view shape. It is realized that the proof masses of MEMS devices may have different top view shapes. Accordingly, to select the locations of protection regions 56, an analysis may be made first to find the possible locations that may be hit by the proof masses. The protection regions are then formed in the locations subject to the hitting of the proof masses, while protection regions 56 may not be formed where not subject to the hitting of proof masses. Depending on the analysis result, protection regions 56 may be formed to overlap the corner regions and/or edge regions of the proof masses, and/or the regions of the proof masses other than the corner regions and edge regions. For example, FIG. 5 illustrates a top view of a three dimensional accelerometer. Proof mass 32 forms capacitors with sensing elements 60 for detecting the acceleration rate in the X-direction. Proof mass 32 also forms capacitors with sensing elements 62 for detecting the acceleration rate in the Y-direction. Proof mass 32 may also form a capacitor with sensing element 64 (which is under proof mass 32) for detecting the acceleration rate in the Z-direction (which is perpendicular to the X direction and the Y-direction). It is observed that regions 66 are possible locations of sensing elements 64 that may be hit by proof mass 32, and hence protection regions 56 may be formed in regions 66 and covering sensing element 64.

In the embodiments, by forming protection regions, which comprise hard materials that do not react with the respective proof masses, the protection regions protect the sensing elements of the MEMS devices from being hit by the proof masses. Accordingly, the stiction between the proof masses and the sensing elements is avoided. Furthermore, with the formation of the protection regions, the hillocks that may form to protrude the top surface of the sensing elements are less likely to form, which causes a further reduction in the stiction.

In accordance with embodiments, a MEMS device includes a sensing element, and a proof mass over and overlapping at least a portion of the sensing element. The proof mass is configured to be movable toward the sensing element. A protection region is formed between the sensing element and the proof mass. The protection region overlaps a first portion of the sensing element, and does not overlap a second portion of the sensing element, wherein the first and the second portions overlap the proof mass.

In accordance with other embodiments, a MEMS device includes a sensing element formed of a first conductive material, and a proof mass formed of a second conductive material, wherein the proof mass and the sensing element form a capacitor. The proof mass is configured to be movable into a space between the proof mass and the sensing element. A protection region is formed of a material having a greater hardness than the hardness of the sensing element, wherein the protection region is configured to prevent the proof mass from hitting any portion of the sensing element.

In accordance with yet other embodiments, a MEMS device includes a sensing element comprising aluminum, and a proof mass comprising silicon, wherein the proof mass, the sensing element, and an air-gap between the sensing element and the proof mass form a capacitor of the MEMS device. A plurality of protection regions is in contact with the sensing element and between the sensing element and the proof mass. The plurality of the protection regions overlaps regions selected from the group consisting essentially of edge regions of the proof mass and corner regions of the proof mass. Some protection regions may be formed to overlap a center region of the proof mass, if necessary.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method comprising:
   forming a sensing element of a Micro-Electro-Mechanical System (MEMS) device over a substrate;
   bonding a proof mass of the MEMS device over the sensing element, wherein the proof mass is configured to rotate along a rotation axis; and
   forming a protection region between the sensing element and the proof mass, wherein the protection region is configured to prevent the proof mass from hitting the sensing element, wherein in a top view of the MEMS device, the protection region has a first edge substantially flush with a second edge of the proof mass, with the second edge being parallel to a longitudinal direction of the rotation axis, and the second edge being farthest from the rotation axis among all edges of the proof mass, and wherein in the top view, no additional protection region is formed between the protection region and the rotation axis.

2. The method of claim 1, wherein the forming the protection region comprises:
   blanket forming a protection layer over an entirety of the sensing element; and
   patterning the protection layer to leave a remaining portion of the protection layer as the protection region.

3. The method of claim 2, wherein the protection region is aligned to a corner region of the proof mass, and wherein a portion of the protection layer aligned to a center region of the proof mass is removed during the patterning.

4. The method of claim 2, wherein after the patterning, portions of the protection layer aligned to edge regions of the proof mass are removed.

5. The method of claim 2, wherein after the patterning, a portion of the protection layer aligned to an edge region of the proof mass is left as the protection region.

6. The method of claim 1, wherein the bonding comprises bonding anchor regions to a metal layer over the substrate, with the anchor regions attached to opposite ends of the rotation axis.

7. The method of claim 1, wherein the bonding comprises an eutectic bonding.

8. The method of claim 1, wherein the proof mass is configured to rotate around the rotation axis in a first direction in response to an acceleration of the proof mass, and to rotate around the rotation axis in a second direction opposite to the first direction in response to a deceleration of the proof mass.

9. The method of claim 1, wherein the protection region comprises a metal nitride.

10. The method of claim 1, wherein the protection region covers an entirety of a surface of the sensing element that faces the proof mass.

11. A method comprising:
    forming a sensing element of a Micro-Electro-Mechanical System (MEMS) device over a substrate;
    bonding a proof mass of the MEMS device over the sensing element, wherein the proof mass is configured to rotate around a rotation axis in a first direction in response to an acceleration of the proof mass, and to rotate around the rotation axis in a second direction opposite to the first direction in response to a deceleration of the proof mass; and
    forming a protection region between the sensing element and the proof mass, wherein the protection region is configured to prevent the proof mass from hitting the sensing element.

12. The method of claim 11, wherein the forming the protection region comprises:
    blanket forming a protection layer over an entirety of the sensing element; and
    patterning the protection layer to leave a remaining portion of the protection layer as the protection region.

13. The method of claim 12, wherein after the patterning, a portion of the protection layer aligned to an edge region of the proof mass is left as the protection region.

14. The method of claim 11, wherein the bonding comprises bonding anchor regions to a metal layer over the substrate, with the anchor regions attached to opposite ends of the rotation axis.

15. The method of claim 11, wherein the bonding comprises an eutectic bonding.

16. A method comprising:
    forming a sensing element of a Micro-Electro-Mechanical System (MEMS) device over a substrate;
    bonding a proof mass of the MEMS device over the sensing element, wherein the proof mass is configured to rotate along a rotation axis, wherein the proof mass has a first portion and a second portion on opposite sides of the rotation axis, and the first portion is wider than the second portion; and forming a protection region between the sensing element and the proof mass, wherein the protection region is configured to prevent the proof mass from hitting the sensing element, and the protection region is formed of a metal nitride.

17. The method of claim 16, wherein the first portion has a first edge parallel to the rotation axis, with the first edge being a farthest edge of the first portion from the rotation axis, and the second portion has a second edge parallel to the rotation axis, with the second edge being an additional farthest edge of the second portion from the rotation axis, and wherein the first edge and the rotation axis has a first distance, and the second edge and the rotation axis has a second distance smaller than the first distance.

18. The method of claim 17, further comprising forming a plurality of protection regions between the sensing element and the proof mass, wherein in a top view of the MEMS device, all protection regions are adjacent to either the first edge or the second edge.

19. The method of claim 16, wherein the bonding comprises an eutectic bonding.

20. The method of claim 16, wherein the proof mass is configured to rotate around the rotation axis in a first direction in response to an acceleration of the proof mass, and to rotate around the rotation axis in a second direction opposite to the first direction in response to a deceleration of the proof mass.

* * * * *